D. W. BURNHAM.
PULLEY-CLUTCH.

No. 174,190. Patented Feb. 29, 1876.

WITNESSES.
J. Wm Garners
F. M. Burnham.

INVENTOR.
Daniel W. Burnham
per
F. A. Lehmann, Atty.

UNITED STATES PATENT OFFICE.

DANIEL W. BURNHAM, OF NEW HAVEN, CONNECTICUT.

IMPROVEMENT IN PULLEY-CLUTCHES.

Specification forming part of Letters Patent No. 174,190, dated February 29, 1876; application filed January 13, 1876.

*To all whom it may concern:*

Be it known that I, DANIEL W. BURNHAM, of New Haven, in the county of New Haven and State of Connecticut, have invented certain new and useful Improvements in Pulley-Clutches; and I do hereby declare the following to be a full, clear, and exact description of the invention, such as will enable others skilled in the art to which it pertains to make and use it, reference being had to the accompanying drawing, which form part of this specification.

My invention relates to an improvement in pulley-clutches; and it consists in the arrangement and combination of parts that will be more fully described hereinafter, whereby the movement of the pulleys can be regulated or entirely arrested at will.

The accompanying drawing represents a horizontal section of my invention, in which—

Figure 1:
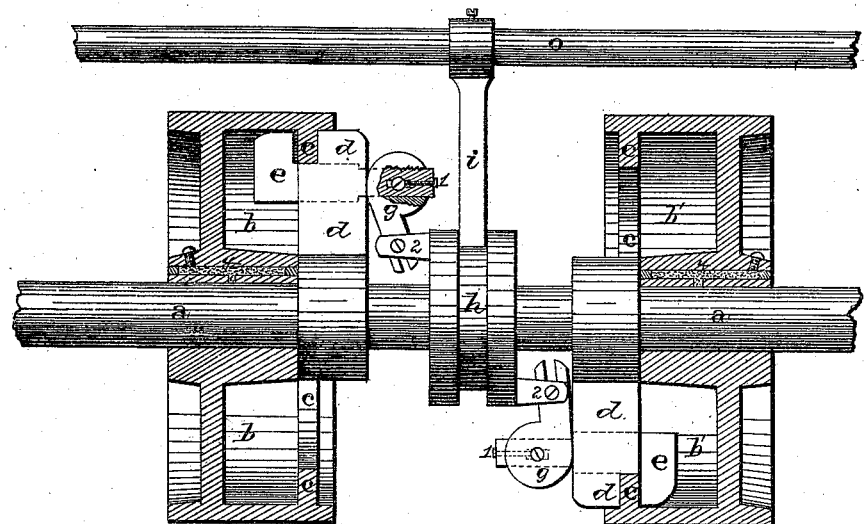
Figure 2:
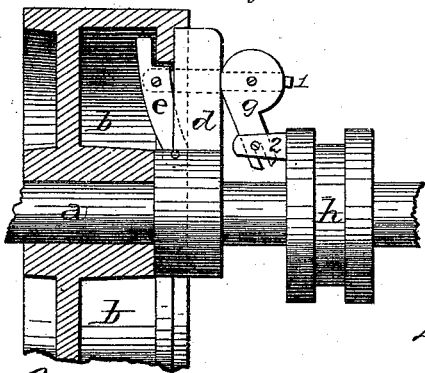

Figure 1 is a horizontal section; and Fig. 2 a modification of the same.

$a$ represents the shaft upon which are placed the two loose pulleys $b$ $b'$, inside of which pulleys are cast the flanges $c$. Two pulleys are here shown, such as are used for screw-cutting machines; but in all common machinery but one is needed and used. Rigidly secured to the shaft, by means of set-screws or other suitable devices, just inside of each pulley is an arm, $d$, which arm has a shoulder formed on the inner side of its outer end, so as to just fit the flange $c$ on the inside of each pulley. This arm $d$ has a mortise immediately under the shoulder, and through it passes a sliding clamp, $e$, the inner end of which catches against the inside of the flange $c$, so that if the clamp is tightened by a longitudinal movement the flange will be held between the arm $d$ on the outside and the clamp $e$ on the inside, the pulley having a slight movement on the shaft toward the arm $d$. Instead of a single arm, as here shown, the arm may not only project from both sides of the shaft, but it will be made, for powerful machinery, wide enough to cover either the whole of the outside of the flange or the greater part of it; and instead of a single clamp to each pulley, there will be two, three, or more. Where these arms are made in the form of a disk, instead of the clamp passing through them, the clamp will be pivoted to the hub of the arm $d$, and the operating-cam will then be pivoted to the center of the clamp, and will actuate its upper end so as to make it clamp the inside of the flange.

A slotted cam, $g$, is pivoted in a slot near the outer end of the clamp, and adjusted by the screw 1, or other equivalent devices, which bears against a pin by which the cam $g$ is secured to the clamp, for the purpose of compensating for the wear on the clutch, flange, and arm. The lower end of the cam is pivoted between the ears 2, which ears project from a disk, $h$, which moves laterally upon the shaft $a$. This disk has a groove in its circumference, in which the end of the lever $i$ catches, for the purpose of moving the disk $h$ toward either pulley desired, the said lever being rigidly secured to a shifting-shaft, $o$. When the disk is midway between the two pulleys both are free to turn upon the shaft. But if by means of the lever the disk $h$ is pushed toward one or the other of the pulleys, the one nearest to the disk will be clamped by the action of the cam, while the other remains entirely free.

If preferred, a flange may be made upon the arms or hub of the pulley instead of upon its inner surface, as shown, and which flange will be clamped in the same manner.

In or through each hub, just to one side of the shaft, there is bored a hole, 4, and leading into this hole is one from the top, through which the oil is poured, and one from below, through which the oil finds its way to the shaft.

The hole 4 having been filled with cotton or other material, and then stopped at the ends, is filled with oil, which is held in the cotton, and only let go in just sufficient quantity to perfectly lubricate the shaft.

Having thus described my invention, I claim—

1. In a clutch, the combination of a flanged pulley, $b$ $c$, a double clamp, $e$ $d$, and cam $g$, substantially as shown.

2. The combination of the arm $d$, clamp $e$, cam $g$, ears 2, disk $h$, and flange $c$, substantially as described.

3. In a clutch, the combination of the clamp $e$, cam $g$, arm $d$, and a regulating set-screw, 1, to take up the wear upon the clutch, flange, and arm, as specified.

4. In combination with a loose pulley, having an internal flange, c, cast with the pulley, a rigid arm, d, that bears against the outer face of the flange, a clamp, and an operating device, substantially as specified.

In testimony that I claim the foregoing I have hereunto set my hand.

DANIEL W. BURNHAM.

Witnesses:
HENRY B. BROWN,
RUSSELL T. ELLIS.